INVENTORS M. R. BARBER
R. E. FISHER
BY
Robert B. Anderson
ATTORNEY

United States Patent Office 3,460,122

Patented Aug. 5, 1969

3,460,122
PULSE CODE MODULATION APPARATUS

Mark R. Barber, Summit, and Reed E. Fisher, Parsippany-Troy Hills Township, Morris County, N.J., assignors to Bell Telephone Laboratories, Incorporated, New York, N.Y., a corporation of New York Filed Feb. 23, 1966, Ser. No. 529,453
Int. Cl. H03k 7/06
U.S. Cl. 332—10 10 Claims

ABSTRACT OF THE DISCLOSURE

An analog-to-digital converter is disclosed that uses a balanced modulator to form a modulated signal having both a phase, of either zero or 180 degrees, and an amplitude that are representative of the amplitude of the analog signal. This modulated signal is then fed through a series of phase-responsive coder stages, each of which determines a digit in the Gray or binary code representation of the analog signal.

This invention relates to pulse code modulation encoders, and more particularly, to apparatus for converting analog voltage signals to voltage binary digits representative of such signals.

It has long been recognized that transmission distortion in electrical communications systems can be reduced by transmitting intelligence as pulse code modulations rather than as analog voltages. Pulse codes may, for example, be conveniently defined only by positive polarity and negative polarity voltage pulses ("1" and "0" digits) at periodic intervals. Accurate reproduction after transmission then requires detection only of the polarity of voltages, and transmission distortions and losses that affect the relative magnitudes of transmitted voltages do not necessarily impair system fidelity. It has also been recognized that the Gray code (or inverted binary code) is often preferable to the conventional binary code for digital transmission because Gray code digit errors that do occur have a smaller effect on faithful signal reproduction. The Gray code is described in the patent of Gray, 2,632,058, granted Mar. 19, 1953, and assigned to Bell Telephone Laboratories, Incorporated.

One type of Gray code encoder is described in the paper "An Unusual Electronic Analog-Digital Conversion Method," by B. D. Smith, IRE Transactions on Instrumentation, June 1956, pages 155–160. As is usually the case with such encoders, the Smith apparatus operates on a succession of increments or samples of the analog voltage to be encoded. Each sample is transmitted through a series of stages in which its polarity is compared with successive reference voltages. Each stage releases a voltage output representative of the polarity of the sample in that stage. By combining the outputs of the various stages, a Gray code "word" of binary digits (bits) is derived which is representative of the magnitude of a specific analog voltage sample.

Sophisticated solid state versions of the Smith apparatus have been constructed which are capable of sampling the input signal at a rate of 12 megacycles per second and releasing 9 bit words at a bit rate of 108 megabits per second (108,000,000 digits per second). While this encoder speed is impressive, higher input signal frequencies require even higher sample rates and bit rates so that an appropriately representative number of samples of the rapidly fluctuating input waveforms can be taken.

Accordingly, it is an object of this invention to increase the speed of pulse code modulation encoders.

This and other objects of the invention are attained in an illustrative embodiment thereof comprising a conventional "sample and hold" device for recurrently deriving samples of the average voltage amplitudes of an analog signal over small time intervals. These samples are transmitted to a balanced modulator where they amplitude and phase modulate a high frequency carrier wave. An inherent characteristic of a balanced modulator is that its output is of a first phase if the input modulating voltage is of one polarity and of a second phase if the input voltage is of the opposite polarity. The first and second phases are 180 degrees apart and will therefore be respectively referred to as the 0 phase and the $\pi$ phase.

The output of the balanced modulator is directed through a succession of phase-responsive stages, the role of each being to release either of two digital output voltages in response to the phase of the carrier applied thereto. The stage generates one digital voltage in response to a $\pi$ phase input and an opposite voltage in response to the zero phase. In addition, each stage modifies the carrier energy so that the output carrier is a direct linear function of the input of the stage, but the phase is constant regardless of the phase of the input. Between each stage, reference carrier energy is added to the output of the preceeding stage so as to modify the phase and magnitude of the carrier applied as the input to the succeeding stage. With a reference carrier of the proper magnitude and phase, as will be described hereafter, the digital output voltages of the stages will together form a Gray code representation of the magnitude of the input sample to the encoder. It can be shown that, with a sufficiently high frequency carrier energy, our encoder is capable of speeds much higher than those previously attainable.

Since it is intended that the phase of the output of each stage shall be constant regardless of whether the input is of $\pi$ or 0 phase, some sort of selective digital phase shifter should be included in each stage. In accordance with another feature of this embodiment of the invention, the input carrier energy to each stage is transmitted through a circulator to a reflection-type phase shifter comprising a waveguide, opposite walls of which are interconnected by a pair of diodes. The input carrier energy is transmitted by the waveguide from the circulator toward the diodes. The diodes are biased by the digital output voltage of the stage by way of the center conductor of a coaxial cable extending through an end wall of the waveguide. The diode characteristics are arranged with respect to the waveguide characteristics such that when the diodes are biased in one direction they are at series resonance and hence constitute a virtual short circuit across the waveguide. When they are biased in the opposite direction, the diodes form a parallel resonance with the end wall of the waveguide and constitute a virtual open circuit. The waveguide is preferably rectangular and transmits carrier energy in a $TE_{10}$ mode while the coaxial cable transmits diode bias energy in the TEM mode. With proper coaxial cable dimensions as will be explained later, the $TE_{10}$ carrier energy is restricted to the waveguide and cannot be transmitted by the cable. When the diodes are biased to obtain parallel resonance they will shift the phase by 180 degrees with respect to the phase shift obtained at series resonance. Since the diode bias changes only in response to a changed phase of the input to the stage, the carrier output of the phase shifter is of a constant phase regardless of the carrier input phase.

In accordance with another embodiment of the invention, the successive stages are modified to release a binary digital output rather than a Gray code output. As before, each stage releases one of two digital output voltages depending on whether the carrier input is of $\pi$ phase or 0 phase. If the input carrier is of one phase, the output carrier of that stage is a direct linear function of the input. If, however, the input carrier is of the opposite phase, the output is an inverse linear function of the input and the phase of the carrier is shifted by 180 degrees. Hence, as before, the phase of the output of each stage is constant regardless of the phase of the input. A reference carrier is applied between stages to shift the magnitude and phase of the carrier applied at the input to the succeeding stage. As will be explained later, combining the digital outputs of the various stages gives a binary representation of the input analog sample to the balanced modulator.

These and other objects and features of the invention will be more fully understood from a consideration of the following detailed description, taken in conjunction with the accompanying drawing in which.

Figure 1:
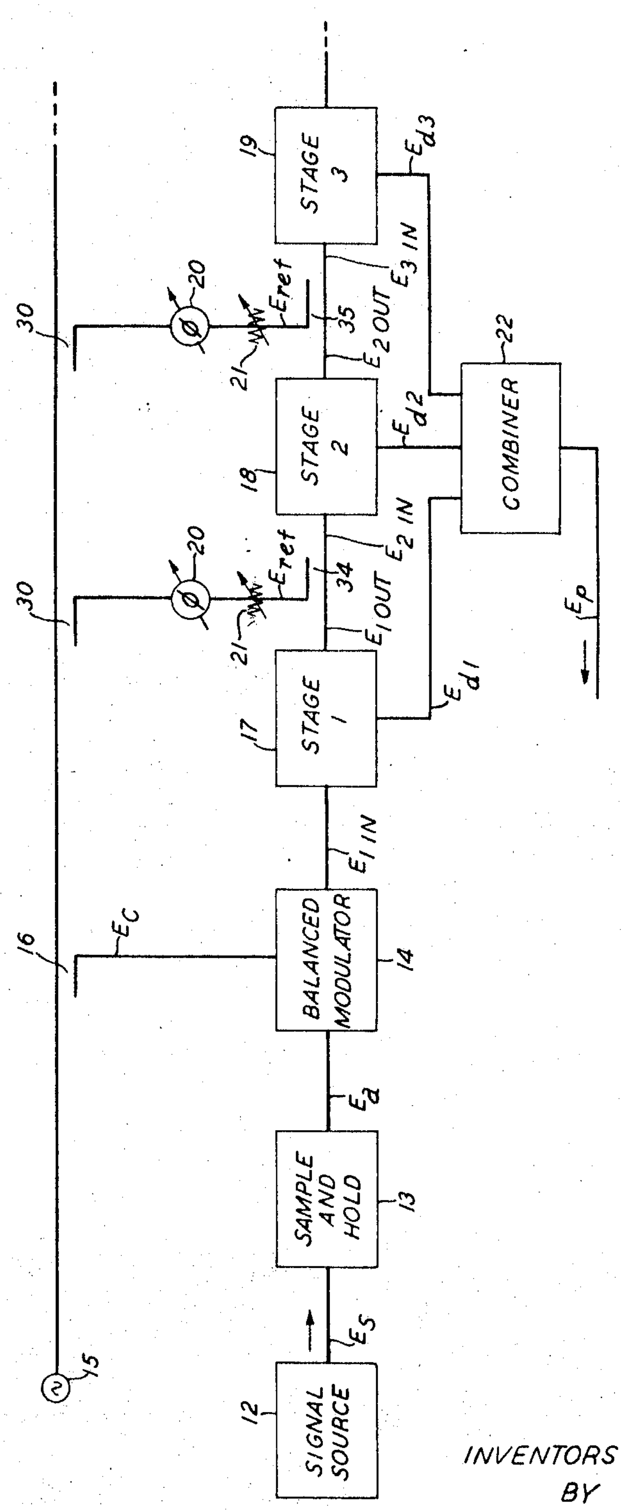
FIG. 1 is a schematic block diagram of a pulse code modulation encoder in accordance with the invention.
Figure 2:
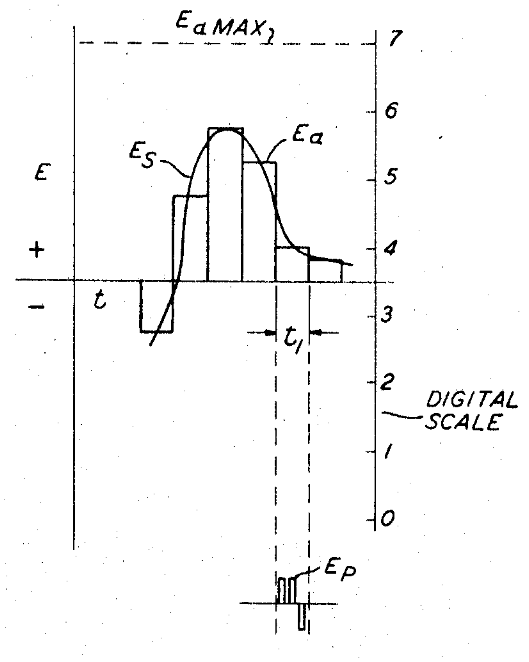
FIG. 2 is a graph illustrating the relationship of the input analog signal of the encoder of FIG. 1 to the analog sample voltage and the output voltage pulses of the encoder of FIG. 1.

Referring now to FIG. 1, there is shown a block diagram of an illustrative encoder the purpose of which is to convert analog signal modulations to pulse code modulations. The analog signal voltages $E_s$ from a signal source 12 is transmitted to a sample and hold device 13 which derives analog samples $E_a$ of the analog waveform. The sample and hold device 13 is of a type known in the art which generates periodic voltages that are representations of the average amplitude of a changing voltage $E_s$ over small time intervals, as is illustrated by the graph of FIG. 2.

The analog voltage sample $E_a$ is transmitted to a balanced modulator 14 where it modulates high frequency carrier energy $E_c$ coupled from a constant frequency source 15 by a directional coupler 16. An inherent characteristic of a balanced modulator is that the modulated output will be either of a first or a second phase depending upon the polarity of the modulating voltage. These two phases are 180 degrees apart and so they are referred to as the 0 phase and the $\pi$ phase. Assume for illustration that the carrier frequency voltage $E_{2\ in}$ generated by the balanced modulator 14 will be of $\pi$ phase for a positive polarity analog sample $E_a$ and of 0 phase for a negative polarity analog sample $E_a$.

Connected in series to the balanced modulator are successive phase-responsive encoder stages 17, 18, and 19. Each stage generates a digital output voltage $E_d$ which is indicative of the phase of the carrier frequency of energy applied to the stage. For illustration, stage 1 will generate a positive voltage $E_{d1}$ if the phase of $E_{1\ in}$ is of the $\pi$ phase and a negative voltage $E_{d1}$ of $E_{1\ in}$ is of the 0 phase. The stages include selective phase shifting apparatus so that the output of stage 1, $E_{1\ out}$, is of a fixed phase regardless of the phase of $E_{1\ in}$. Whether the magnitude of $E_{1\ out}$ is a direct or inverse function of $E_{1\ in}$ depends upon whether the encoder is to be used for generating a Gray code or a binary code, as will be explained later. Reference carrier energy $E_{ref}$ is applied between successive stages for the purpose of shifting the phase and amplitude of the carrier energy applied to the successive stages. The reference energy is preferably derived from constant source 15 by way of directional coupler 30, phase shifter 20, and attenuator 21.

With properly constructed stages 17, 18, and 19, the digital output voltages $E_{d1,\ 2,\ 3}$ will be representative of successive digits in a code word which describes the amplitude of one voltage sample $E_a$. These output voltages are combined in a combiner 22 having appropriate delays and gates for converting the digital voltages to pulses $E_p$ having appropriate periodic intervals for defining the coded word.

Referring to FIG. 2, the analog sample $E_a$ at time interval $t_1$ has a magnitude of 4 on a digital scale. This magnitude is represented by the Gray code as three successive binary pulses $E_p$ which define the Gray code word 110 which is representative of the Arabic number 4. The combiner 22 generates pulses $E_p$ so that each word extends over the time interval $t_1$ of the analog sample which it represents. Additional stages can be used in the encoder for giving a larger number of binary digits or bits for each code word to be transmitted. The use of three bit words for expressing magnitudes at only eight digital levels is used herein only for purposes of illustration.

Figure 3:
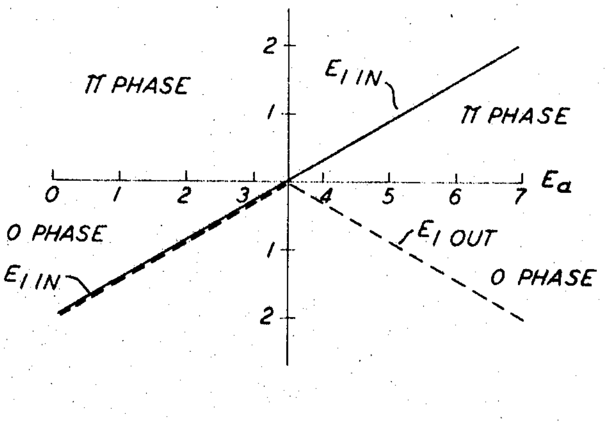
FIG. 3 is a graph of voltages $E_{1\ in}$ and $E_{1\ out}$ with respect to the voltage $E_a$ in a Gray code embodiment of the encoder of FIG. 1.

FIG. 3 shows a graph of the amplitude and phase of the energy generated by the balanced modulator $E_{1\ in}$ with respect to the applied analog voltage $E_a$. As shown in FIG. 2, the polarity of $E_a$ changes at 0 volts, which in the example shown is 3½ on the digital scale. When $E_a$ has a positive polarity, or a digital value above 3½, $E_{1\ in}$ is of $\pi$ phase as shown by quadrants 1 and 2. If $E_a$ has a negative polarity, corresponding to a digital value less than 3½, $E_{1\ in}$ has 0 phase indicated by quadrants 3 and 4. The amplitude scale of $E_{1\ in}$ is arbitrary; a maximum of $E_{1\ in}$ of 2 corresponding to a maximum $E_a$ of 7 on the digital scale has been chosen merely for purposes of illustration.

The phase and magnitude of the balanced modulator energy transmitted to the first stage, $E_{1\ in}$, can be derived mathematically as follows. The carrier input $E_c$ to the modulator can be expressed as, $$E_c = \cos A\omega t+\varphi) \qquad (1)$$

where $\varphi$ denotes carrier phase. Arbitrarily letting $\varphi$ equal $\pi$ radians, the modulator output $E_{1\ in}$ will be of the form $$E_{1\ in} = kE_a \cos(\omega t+\pi) \qquad (2)$$

where $k$ is an arbitrary (real) constant and $E_a$ is a voltage having both positive or negative polarity, as explained above, and appropriate magnitude, both depending on the magnitude, as expressed on the digital scale, of the applied analog voltage. It must be emphasized that although the examples used in this specification frequently refer to values on the digital scale, $E_a$ when used in an equation refers to a voltage with a polarity and a magnitude not necessarily the same as the magnitude, as expressed on the digital scale, of the same voltage. When $E_a$ is of a positive polarity (positive amplitude), $$E_{in} = k|E_a| \cos(\omega t+\pi) \qquad (3)$$

when $E_a$ is of a negative amplitude, $$E_{1\ in} = -k|E_a| \cos(\omega t+\pi) \qquad (4)$$

or, $$E_{1\ in} = k|E_a| \cos(\omega t+0) \qquad (5)$$

These equations show that the envelope height (magnitude) of $E_{1\ in}$ is proportional to the magnitude of $E_a$ and the $E_{1\ in}$ carrier phase depends upon the polarity of $E_a$. As shown in FIG. 3, when $E_a$ is 4 on the digital scale, $E_{1\ in}$ is of the $\pi$ phase.

Figure 4:
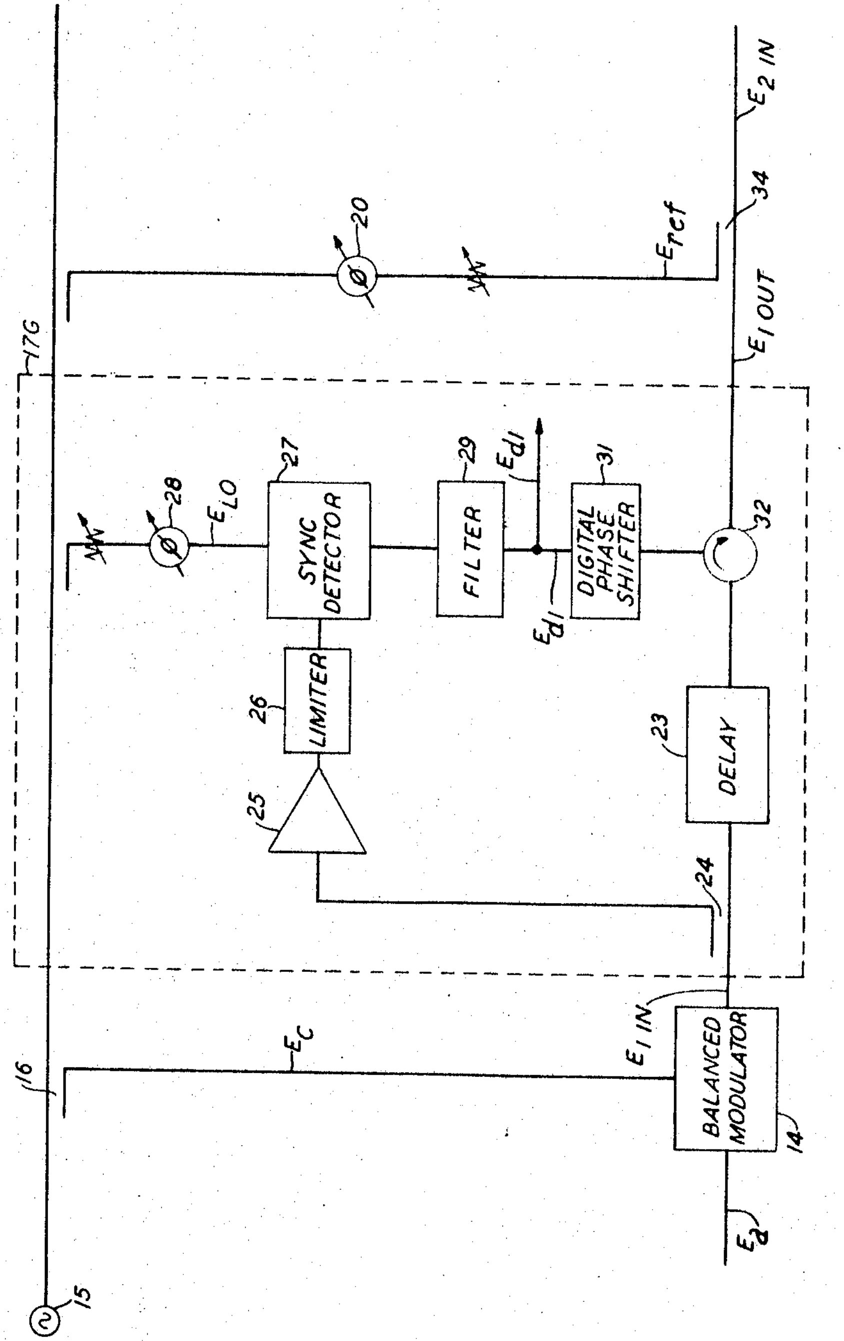
FIG. 4 is a schematic diagram of a Gray code encoder stage which may be incorporated into the circuit of FIG. 1.

FIG. 4 shows the first stage 17G of the Gray code version of the encoder of FIG. 1. $E_{1\ in}$ is divided into two branches by a directional coupler 24, one of which is connected to an amplifier 25, a limiter 26, and a synchronous detector 27. Local oscillator energy $E_{LO}$ is also transmitted to the synchronous detector 27 by way of a variable phase shifter 28. The synchronous detector is constructed in a known manner to release a negative DC voltage in response to a 0 phase input from the limiter 26 and a positive DC voltage in response to carrier input of the $\pi$ phase. $E_{LO}$ is of the same frequency as $E_c$ and of an appropriate phase to discriminate between the 0 and $\pi$ phases as known in the art. The purpose of the amplifier 25 and limiter 26 is to maintain the amplitude of the input carrier $E_{1\ in}$ within an optimum range for detection by detector 27.

The output of the synchronous detector is directed through a low pass filter 29 and is transmitted out of the stage as the digital voltage $E_{d1}$. Note that when $E_a$ is 4 on the digital scale $E_{1\ in}$ is of the $\pi$ phase, and $E_{d1}$ is of positive polarity which indicates that the first pulse represents a "1" of the Gray code representation. $E_{d1}$ is also transmitted to a digital phase shifter 31.

Carrier input $E_{1\ in}$ in the other branch is transmitted to a circulator 32 by way of a delay device 23. The circulator directs the carrier energy to the phase shifter 31 and thence out of the encoder stage 17. If the input carrier is of the 0 phase, the phase shifter 31 is biased with negative digital voltage from the synchronous detector and it reflects carrier energy without any phase shift. If, on the other hand $E_{1\ in}$ is of the $\pi$ phase, the positive voltage generated by the synchronous detector actuates the digital phase shifter 31 so that it reflects the carrier wave with a 180 degree phase shift. This function is illustrated by the dotted portion of the graph of FIG. 3 showing $E_{1\ out}$. Regardless of the phase of the input $E_{1\ in}$, $E_{1\ out}$ always has a 0 phase. The phase shifter does not, however, change the magnitude of the carrier wave; the maximum magnitude of $E_{out}$ is still 2, the same as the maximum magnitude of $E_{in}$.

The role of delay line 23 is to ensure that carrier energy from the circulator 32 reaches phase shifter 31 at the same time as the pulse voltage from the synchronous detector. As will be described more fully later, the digital phase shifter 31 preferably comprises a waveguide, the effective length of which can be switched by a diode that is biased by the pulse voltage $E_d$. When the bias voltage on the diode is positive, the carrier energy is reflected back to the circulator with a 180 degree phase shift.

Figure 5:
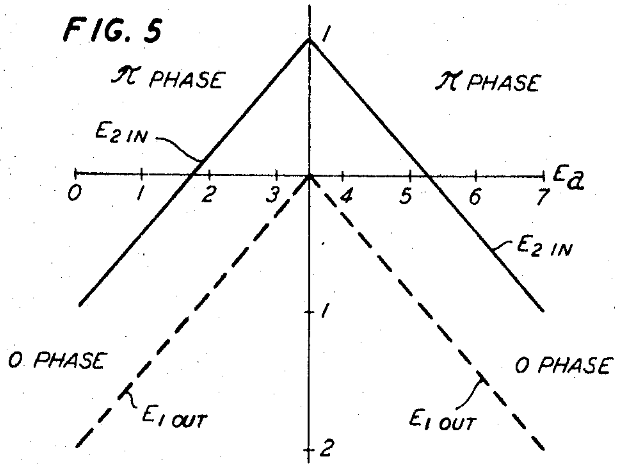
FIG. 5 is a graph of voltages $E_{1\ out}$ and $E_{2\ in}$ versus the voltage $E_a$ in one embodiment of the circuit of FIG. 1.

Before being transmitted to the second stage, the magnitude and phase of the carrier is shifted by a reference carrier $E_{ref}$ which is applied through a directional coupler 34. The phase and magnitude of the carrier $E_{2\ in}$ after the addition of the reference carrier is shown in the graph of FIG. 5. The shifting of the characteristic shown in FIG. 5 is accomplished by using a reference carrier having the form $$E_{ref\ 1}=k\left|\frac{E_{a\ max}}{2}\right|\cos(\omega t+\pi) \quad (6)$$

where $E_{a\ max}$ is the maximum permissible value of $E_a$ as illustrated on the graph of FIG. 2. Of course, the value of $E_{a\ max}$ in volts is not the 7 indicated on the digital scale but rather is the voltage of positive polarity that corresponds to the digital value of 7. When $E_{1\ out}$ is "sliced" by adding $E_{ref}$, the sum $E_{2\ in}$ is given by $$E_2=E_{1\ out}+E_{ref} \quad (7)$$

or, $$E_{2\ in}=\left(k\left|\frac{E_{a\ max}}{2}\right|-\left|E_1\right|\right)\cos(\omega t+\pi) \quad (8)$$

The succeeding stages are identical to the stage shown in FIG. 4. At $E_a=4$ on the digital scale a positive digital voltage will be released by the second stage because, as is shown in FIG. 5, $E_{2\ in}$ is of the $\pi$ phase. Hence, the second digit of the Gray code representation will be a "1."

Figure 6:
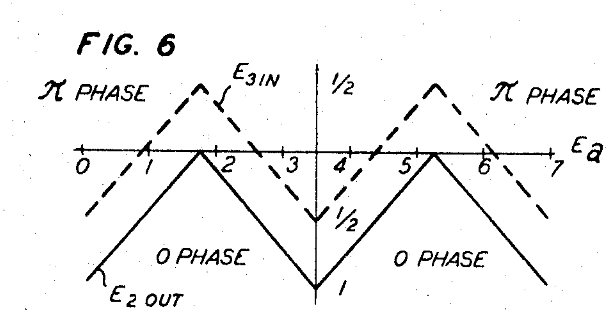
FIG. 6 is a graph of voltages $E_{2\ out}$ and $E_{3\ in}$ versus the voltage $E_a$ in one embodiment of the circuit of FIG. 1.

Since the second stage releases an output $E_{2\ out}$ which is entirely of the 0 phase, without changing the magnitude of $E_{2\ in}$, the characteristic of $E_{2\ out}$ with respect to $E_a$ will be that shown in FIG. 6. Reference energy $E_{ref}$ is then added at the directional coupler 35 shown in FIG. 1. This again effectively "raises" the carrier frequency characteristic to the position shown by the curve $E_{3\ in}$ of FIG. 6. It should be noted that the third stage will generate a negative or "0" pulse voltage output because $E_{3\ in}$ is of the 0 phase when $E_a$ is 4 on the digital scale.

For proper shifting of the phase and magnitude of the carrier wave from $E_{2\ out}$ to $E_{3\ in}$, the reference carrier $E_{ref\ 2}$ applied at directional coupler 35 should be of the form $$E_{ref\ 2}=\left|\frac{kE_{a\ max}}{4}\right|\cos(\omega t+\pi) \quad (9)$$

It should be noted that between each stage the maximum amplitude of the input carrier is reduced by a factor of 2, and that likewise, the amplitude of the reference carrier should be reduced by a factor of 2 between each successive stage. Hence, the reference energy $E_{ref(n)}$ which is applied subsequent to any encoder stage $n$ should conform to the relationship $$E_{ref\ (n)}=\left|\frac{kE_{a\ max}}{2^n}\right|\cos(\omega t+\pi) \quad (10)$$

Alternatively, $E_{ref(n)}$ can be given by $$E_{ref\ (n)}=\left|\frac{E_{in\ (n)\ max}}{2}\right|\cos(\omega t+\pi) \quad (11)$$

where $E_{in(n)}$ is the input carrier energy to stage $n$.

The foregoing discussion illustrates how three stages generate successive digital voltage outputs $E_{d1}$, $E_{d2}$, and $E_{d3}$ which respectively represent the digits 1, 1, and 0 in response to an analog voltage input $E_a$ of 4 on the digital scale. As mentioned before, the combiner 22 relays the digital voltage outputs in the form of appropriate pulses $E_p$ for representing the magnitude of 4 on the digital scale. If $E_a$ were 7 on the digital scale, $E_{1\ in}$ would be $\pi$ phase making $E_{d1}$ of positive polarity or "1," $E_{2\ in}$ would be of 0 phase making $E_{d2}$ of negative polarity or "0," and $E_{3\ in}$ would be of 0 phase making $E_{d3}$ a negative or "0" output. The Gray code number 100 is representative of the Arabic number 7.

One advantage of coding by the use of a microwave carrier is that the bandwidth represents a small fraction of the carrier frequency. This permits the use of simple and cheap components. More importantly, very high carrier frequencies permit extremely high encoder speeds. For example, when $E_c$ has a frequency of approximately 9 kilomegacycles per second, the encoder is capable of a bit rate output of 1200 megabits per second, which represents an order of magnitude improvement over the prior art.

Figure 7:
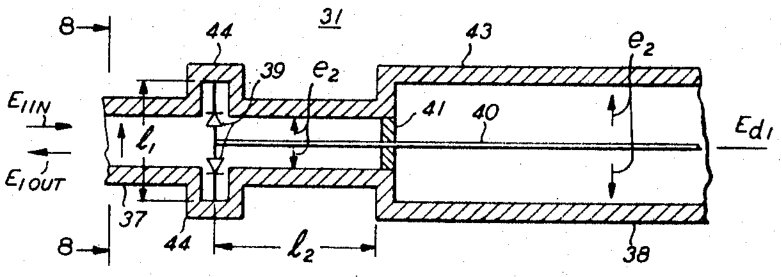
FIG. 7 is a schematic sectional view of a digital phase shifter which may be used in the circuit of FIG. 4.
Figure 8:
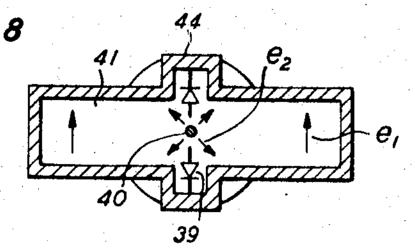
FIG. 8 is a view taken along lines 8—8 of FIG. 7.

With the exception of the digital phase shifter 31, the various components shown in FIG. 4 are well known and commercially available at the high frequencies contemplated by the invention. According to another feature of the invention, a preferred phase shifter 31 for giving an appropriately high frequency response is shown in FIGS. 7 and 8. The device comprises a rectangular waveguide 37 connected to circulator 32 of FIG. 3, and a coaxial cable 38 which is connected to the low pass filter 29. Connected across the rectangular waveguide are a pair of high speed diodes 39, preferably "Shottky barrier" ("hot carrier") or other varieties of low minority carrier storage varactor diodes. The diodes 39 are connected to an inner conductor 40 of the coaxial cable 38 which extends through an end wall 41 of the rectangular waveguide.

The outer conductor 43 of the coaxial cable 38 is directly connected to the end wall 41 of the waveguide.

The inner conductor 40 forward biases or reverse biases the diodes 39 depending upon whether the digital voltage $E_{d1}$ is of the positive or negative polarity. When the diodes 39 are reverse biased due to a negative voltage $E_{d1}$, their series capacitance and series inductance are adjusted to be at series resonance. Waveguide stubs 44 are included on the upper and lower walls of the waveguide 37 for providing an appropriate length $l_1$ for giving series resonance at reverse bias. The series resonance results in a virtual short circuit across the waveguide plane that includes diodes 39 so that the carrier energy $E_{1\ in}$ is reflected back to the circulator as $E_{1\ out}$ with, for example, 0 phase shift. The length $l_2$ between the diodes and the waveguide end wall 41 is adjusted so that when the diodes are forward biased the waveguide section of length $l_2$ forms a capacitance that is in parallel resonance with the inductance of the diodes. This results in a virtual open circuit at the plane of the diodes and gives a relative 180 degree phase shift to the incoming carrier energy. Hence, $E_{1\ out}$ is shifted by $\pi$ radians with respect to $E_{1\ in}$ when the diodes 39 are forward biased.

The rectangular waveguide 37 propagates energy in a $TE_{10}$ mode so that the electric field vectors $e_1$ extend between the upper and lower waveguide walls. The electric field vectors $e_2$ of the coaxial cable, on the other hand, extend radially from the central conductor 40 to the outer conductor 43 of the cable. Transmission of $E_2$ is similar to strip line propagation in the region in which vectors $e_2$ extend from the central conductor 40 to the upper and lower walls of the waveguide. Because of these different modes of propagation, the waveguide carrier energy cannot propagate into the coaxial cable and the coaxial cable energy cannot propagate into the waveguide. However, the characteristic impedance of the strip line portion to the fields $e_2$ should be substantially equal to the characteristic impedance of the coaxial cable for efficient transmission of $E_{d1}$ to the diodes. Because all of the energy transmitted within the device 31 propagates as wave energy, spurious reactances are minimized, and the digital phase shifter is capable of operating at extremely high speeds.

Figure 9:
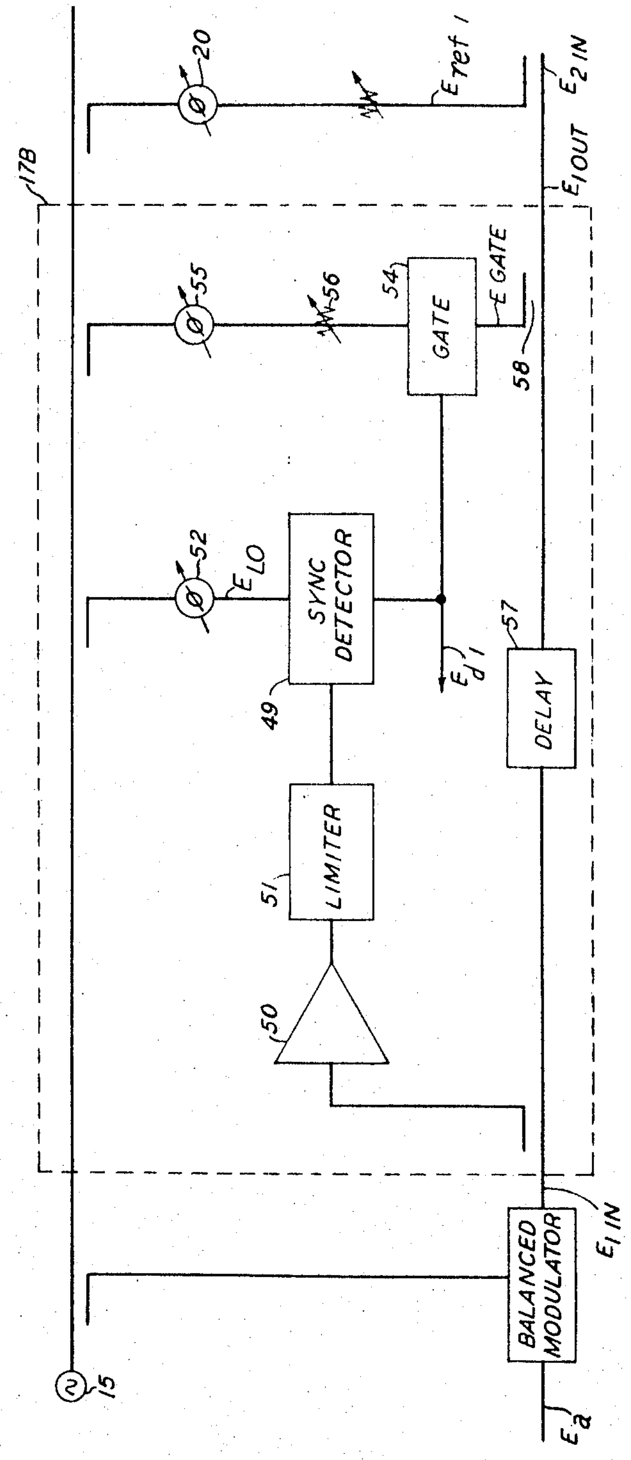
FIG. 9 is a schematic diagram of a binary encoder stage which may be used in the circuit of FIG. 1.

Referring now to FIG. 9 there is shown the first stage 17B of a binary code encoder. When stages identical to stage 17B are used in the encoder of FIG. 1, the combiner 22 releases a pulse code $E_p$ which is a binary code representation of the analog input $E_a$.

The analog voltage $E_a$ modulates a high frequency carrier $E_c$ in the balanced modulator to release the same input $E_{1\ in}$ to the first stage as in the Gray code embodiment. Part of $E_{1\ in}$ is directed to a synchronous detector 49 by way of an amplifier 50 and a limiter 51. As before, the synchronous detector releases a positive or "1" digital voltage output $E_{d1}$ in response to a $\pi$ phase $E_{1\ in}$, and a negative or "0" digital output voltage in response to a 0 phase of $E_{1\ in}$. Local oscillator energy $E_{LO}$ is supplied to the synchronous detector 49 by way of an adjustable phase shifter 52. The synchronous detector 49 is connected to a gate 54. When the digital voltage $E_{d1}$ is positive, it actuates gate 54 to release wave energy $E_{gate}$ that is derived from the source 15 via phase shifter 55 and variable attenuator 56. The carrier energy $E_{1\ in}$ is delayed by delay device 57 so that it arrives at a directional coupler 58 within the time period taken for actuation of the gate 54.

The reference energy $E_{gate}$ that is added to the carrier energy at directional coupler 58 has a magnitude equal to the maximum magnitude of the carrier energy and a phase of 180 degrees with respect to the carrier energy. Since the gate 54 is actuated only in response to a $\pi$ phase of $E_{1\ in}$, the carrier $E_{1\ in}$ is always of the $\pi$ phase when $E_{gate}$ is added at coupler 58. The reference energy can therefore be expressed as $$E_{gate}=|kE_{a\ max}|\cos(\omega t+0) \qquad (12)$$

Figure 10:
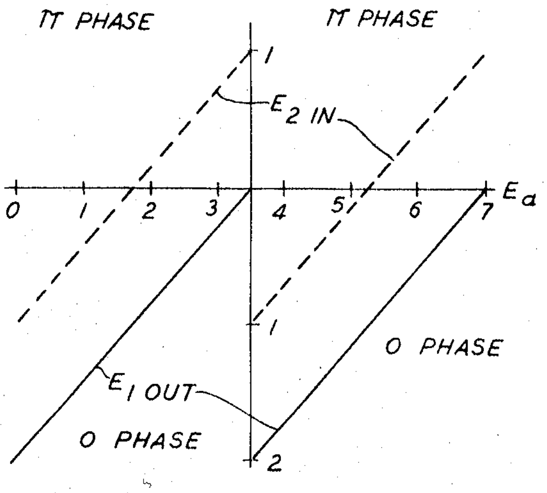
FIG. 10 is a graph of voltages $E_{1\ out}$ and $E_{2\ in}$ versus the voltage $E_a$ in one embodiment of the circuit of FIG. 1.

Since $E_{1\ in}$ is the same in the binary encoder as in the Gray encoder, its characteristic is given by FIG. 3. If $E_a$ has a value of 4 on the digital scale of FIG. 2, the first digital voltage $E_{d1}$ will be positive or "1" because $E_{1\ in}$ is of the $\pi$ phase. The effect of the addition of $E_{gate}$ is shown in FIG. 10. The carrier $E_{1\ out}$ is identical with $E_{1\ in}$ when $E_{1\ in}$ is of the 0 phase. However, when the gate is actuated to add $E_{gate}$, $E_{1\ out}$ is inversely proportional to $E_{1\ in}$.

Consider the situation in which $E_{1\ in}$ is of a small magnitude in the $\pi$ phase. $E_{gate}$ is added in the 0 phase at a maximum magnitude. Hence, $E_{1\ out}$ is at the maximum magnitude of 2 when $E_{1\ in}$ is 0. When $E_{1\ in}$ is at a maximum magnitude in the $\pi$ phase, it destructively interferes with and cancels out the added $E_{gate}$. Hence, when $E_{1\ in}$ is of maximum magnitude in the $\pi$ phase, $E_{1\ out}$ is 0 as shown in FIG. 10.

The reference carrier $E_{ref}$, which is applied between stages, shifts the phase and magnitude of $E_{1\ out}$ in the same manner as described before. $E_{ref\ 1}$ has the form described by Equation 6 while other reference carriers are of the general form of Equation 10. As such, the carrier characteristic $E_{1\ out}$ of FIG. 10 is "raised" to the position shown by $E_{2\ in}$. Notice that at $E_a=4$ on the digital scale, $E_{2\ in}$ is of the 0 phase so that the second digital voltage $E_{d2}$ will be of negative polarity, or a "0."

Figure 11:
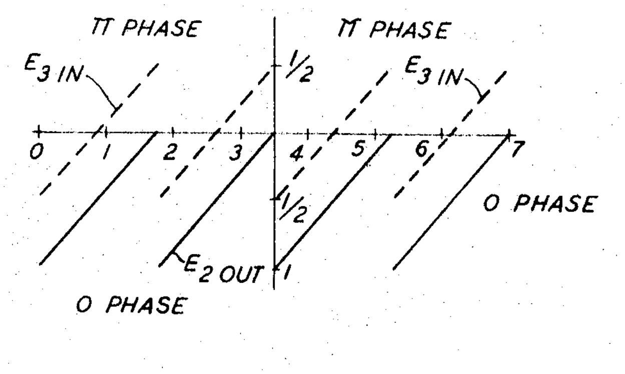
FIG. 11 is a graph $E_{2\ out}$ and $E_{3\ in}$ versus the voltage $E_a$ in one embodiment of the circuit of FIG. 1.

Each of the binary encoder stages are identical with stage 17B of FIG. 9. Hence, as shown in FIG. 11, $E_{2\ out}$ is an inverse function of $E_{2\ in}$ when $E_{2\ in}$ is of the $\pi$ phase. Addition of the carrier $E_{ref\ 2}$ results in the $E_{3\ in}$ characteristic shown in FIG. 11. Notice that with an $E_a$ of 4 on the digital scale, the digital voltage output of the third stage represents a "0."

The foregoing discussion illustrates how a three-stage binary encoder gives a 100 digital voltage output in response to an analog input of 4 on the digital scale. Other examples will show that the successive digital outputs of the binary encoder stages are binary representations of the magnitude of the input analog voltage. The components of the binary stages as shown in FIG. 9 are well known in the art, and can be constructed to respond to high frequencies for giving high output bit rates as mentioned before. It is to be understood that in both the binary and Gray code embodiments, amplifiers, resistors, and other known components may be added for ensuring that the phase and amplitude relationships stated in the various equations are fulfilled. Notice that the digital phase shifter of FIGS. 7 and 8 is not used in the binary encoder embodiment. The gate 54 for switching the phase of the carrier energy can take a number of forms known in the art which are capable of operating at the frequencies described.

The specific structures which have been shown are presented only for purposes of illustration. For example, the pulse codes can be represented by the presence and absence of pulses, or in other known ways. Sampling devices other than that shown can be used, and if so desired, no sampling device at all need be used, in which case successive increments of a continuous analog voltage are treated as samples. Various other modifications and embodiments may be employed by those skilled in the art without departing from the spirit and scope of the invention.

What is claimed is:

1. An encoder comprising:

moduator means for modulating high frequency carrier energy with voltage that is an analog representation of a signal;

the modulator means inherently generating an output having a first phase in response to an analog voltage input of one polarity and having a second phase 180 degrees removed from the first phase in response to an analog voltage input of the opposite polarity;

a series of phase-responsive stages each of which generates a first output voltage in response to the phase of high frequency carrier energy applied thereto, the first of said series of stages being connected to the modulator;

each stage also including means for generating a second output carrier voltage that is transmitted to the succeeding stage; and means included between each successive stage for applying reference high frequency energy and thereby shifting at least one of the phase and magnitude of the second output carrier voltage of successive stages.

2. An encoder in accordance with claim 1 wherein:

the modulator inherently generates an output having a $\pi$ phase in response to an analog voltage input of one polarity and having a zero phase in response to an analog voltage input of the opposite polarity;

the first output voltage of each stage is of a first magnitude in response to a $\pi$ phase input and of a second magnitude in response to a zero phase input.

3. The encoder of claim 2 further comprising:

means connected to the modulator for recurrently deriving discrete samples of the voltage amplitude of the signal, the samples constituting the analog voltage input to the modulator, whereby the first output of each stage is in the form of discrete voltage of the first magnitude or the second magnitude;

and means for combining the first outputs of the stages to form a pulse code representation of the signal.

4. The encoder of claim 2 wherein:

each phase-responsive stage includes means for generating a second output voltage having a magnitude which is a linear function of the input of such stage, but the phase of which is constant regardless of the phase of the input.

5. The encoder of claim 4 wherein:

the output modulated carrier energy $E_{1\ in}$ of the modulator means has the form $$E_{1\ in}=E_a \cos (\omega t+\pi)$$

where $E_a$ is the analog voltage input to the modulator and $\cos (\omega t+\pi)$ describes the frequency and phase of the carrier input to the modulator;

the means for applying reference energy comprises means for adding to the output of each stage $n$ energy $E_{ref(n)}$ having the form $$E_{ref\ (n)}=\left|\frac{kE_{a\ max}}{2^n}\right| \cos (\omega t+\pi)$$

where $E_{a\ max}$ is the maximum amplitude of the input analog voltage and $k$ is a constant.

6. The encoder of claim 2 wherein the first output generating means of each stage comprises a synchronous detector to which is applied the input carrier of the stage and local oscillator energy of the same frequency as that of the carrier energy.

7. The encoder of claim 4 wherein:

the second output generating means of each stage comprises a digital phase shifter.

8. The encoder of claim 2 wherein:

each phase-responsive stage includes means for generating a second output voltage, the magnitude of which is a direct linear function of the input to such stage when the input is of one phase, an inverse linear function when the input is of an opposite phase, but the phase of which is constant regardless of the phase of the input.

9. The encoder of claim 8 wherein:

the second voltage generating means comprises switching means for adding to the input voltage of the stage a carrier frequency that is 180 degrees out-of-phase with respect to the input voltage;

and means for actuating said switching means for making the said addition only when the input voltage is of one phase.

10. The encoder of claim 9 wherein:

the output modulated carrier energy $E_{1\ in}$ of the modulator means has the form $$E_{1\ in}=E_a \cos (\omega t+\pi)$$

where $E_a$ is the analog voltage input to the modulator and $\cos (\omega t+\pi)$ describes the frequency and phase of the carrier input to the modulator;

the means for applying reference energy comprises means for adding to the output of each stage $n$ energy $E_{ref(n)}$ having the form $$E_{ref\ (n)}=\left|\frac{kE_{a\ max}}{2^n}\right| \cos (\omega t+\pi)$$

where $E_{a\ max}$ is the maximum amplitude of the input analog voltage and $k$ is a constant.

References Cited

UNITED STATES PATENTS

| | | | |
|---|---|---|---|
| 2,832,827 | 4/1958 | Metzger | 340—347 |
| 3,044,003 | 7/1962 | Stavis et al. | 332—21 |
| 3,161,868 | 12/1964 | Waldhauer | 340—347 |
| 3,386,052 | 5/1968 | Thomas | 333—29 |

MAYNARD R. WILBUR, Primary Examiner

JEREMIAH CLASSMAN, Assistant Examiner

U.S. Cl. X.R.

325—141; 340—347